(12) United States Patent
Dischamp

(10) Patent No.: US 7,219,844 B2
(45) Date of Patent: May 22, 2007

(54) METHODS FOR PROTECTING A SMART CARD

(75) Inventor: Paul Dischamp, Paris (FR)

(73) Assignee: Oberthur Card Systems SA, Paris (FR)

( * ) Notice: Subject to any disclaimer, the term of this patent is extended or adjusted under 35 U.S.C. 154(b) by 91 days.

(21) Appl. No.: 10/473,815

(22) PCT Filed: Mar. 27, 2002

(86) PCT No.: PCT/FR02/01058

§ 371 (c)(1),
(2), (4) Date: Mar. 12, 2004

(87) PCT Pub. No.: WO02/080094

PCT Pub. Date: Oct. 10, 2002

(65) Prior Publication Data

US 2004/0145339 A1  Jul. 29, 2004

(30) Foreign Application Priority Data

Apr. 2, 2001  (FR) .................................. 01 04453

(51) Int. Cl.
*G06K 19/06* (2006.01)
(52) U.S. Cl. .................... 235/492; 235/451; 235/487

(58) Field of Classification Search ................ 235/492, 235/487, 451, 380
See application file for complete search history.

(56) References Cited

U.S. PATENT DOCUMENTS

| | | | | |
|---|---|---|---|---|
| 4,575,621 A * | 3/1986 | Dreifus | ......................... | 235/380 |
| 4,843,224 A * | 6/1989 | Ohta et al. | .................. | 235/487 |
| 4,985,921 A * | 1/1991 | Schwartz | ..................... | 713/193 |
| 6,507,913 B1 * | 1/2003 | Shamir | ......................... | 726/36 |
| 6,561,430 B2 * | 5/2003 | Ou | ............................... | 235/487 |
| 2002/0014537 A1 * | 2/2002 | Obana et al. | ................ | 235/492 |

FOREIGN PATENT DOCUMENTS

| | | |
|---|---|---|
| DE | 199 11 673 | 9/2000 |
| FR | 2 616 941 | 12/1988 |
| FR | 2 793 904 | 11/2000 |
| WO | 01/08088 | 2/2001 |

* cited by examiner

*Primary Examiner*—Steven S. Paik
(74) *Attorney, Agent, or Firm*—Young & Thompson

(57) ABSTRACT

A method for protecting an electronic entity such as a smart card, against simple/differential power analysis, by integrating a current accumulator in said entity. The current accumulator (19) powers a processor (P) via a multiplexer (20) when the processor is loaded to execute so-called sensitive operations.

10 Claims, 1 Drawing Sheet

METHODS FOR PROTECTING A SMART CARD

This is a National Stage application of PCT Application PCT/FR02/01058 filed Mar. 27, 2002 that claims the priority of French Application 01/04453 filed Apr. 2, 2001.

BACKGROUND OF THE INVENTION

The invention relates to a method of protecting an electronic entity including a microcircuit, in particular a microcircuit card with encrypted access, said protection being aimed more particularly at forms of attack known as "current analysis". The invention also relates to an electronic entity including a microcircuit, in particular a microcircuit card with encrypted access, equipped with means for obtaining the protection offered by said method.

The person skilled in the art knows that some electronic entities with encrypted access, in particular microcircuit cards, are vulnerable to certain forms of attack based on analyzing certain parameters during a phase of their operation. It is said that information can "leak" from a computation carried out in said electronic entity (the card), typically the execution of a cryptographic protocol instigated by a fraudster in illegal possession of the card. The parameters analyzed during the execution of this kind of protocol can typically be computation time differences or differences in electromagnetic radiation during execution of the computation, but above all are the current consumed by the electronic entity itself during the execution of a cryptographic protocol.

Thus a standard attack consists in having the electronic entity that has fallen into the hands of the fraudster execute a certain number of cryptographic protocols based on random messages, which are therefore bound to fail, but cause the entity (the microcircuit card) to execute each time a cryptographic algorithm, for example the DES (DATA ENCRYPTION STANDARD) algorithm, and analyzing the current consumed during each execution of said DES algorithm. The object of this attack is to discover the secret key of said entity. The DES algorithm is very widely used at present in the field of bank cards, SIM (GSM) cards, pay per view television access cards, and access control cards.

In the case of fraud, i.e. when the fraudster has the card and is seeking to determine the key, the fraudster can connect said card to a reader by means of which he can transmit messages to it and connect it to means for recording the current consumed by the microcircuit during the execution of the operations that it carries out. The fraudster instigates multiple execution of the DES algorithm and the current consumption is detected and memorized each time. From all of this data, and in particular from the current consumption measurements, it is possible to mount attacks whose principle is well known. These SPA-DPA (Simple Power Analysis/Differential Power Analysis) attacks can reconstitute the key of the electronic entity.

In a paper presented on 17 Aug. 2000 at the CHES 2000 conference and published by SPRINGER under the N° 1965, the use of a battery integrated into the electronic entity to supply power to the microcircuit is envisaged. However, the author of the paper finishes by setting aside this solution, deeming it somewhat impractical and difficult to put into practice. The invention solves the problems referred to by the author of this paper.

SUMMARY OF THE INVENTION

To be more precise, the invention provides a method of protecting a microcircuit electronic entity such as a microcircuit card against current analysis attack, of the type consisting in associating with said microcircuit an energy store placed inside said entity, characterized in that, during an exchange of information in which said entity is coupled to a server adapted to provide it with an electrical power supply, at least a portion of said microcircuit is supplied with electrical power provided by said energy store during the execution of predetermined operations by said at least one portion of said microcircuit, said server supplying electrical power to said microcircuit during the execution of other operations.

The aforementioned energy store can be a battery, preferably a rechargeable battery. In this case, the battery can be charged on each transaction, i.e. each time that the electronic entity is coupled to a server capable of supplying to it the necessary electrical energy. The microcircuit is preferably designed and programmed to command charging of the battery outside time periods in which it is being used to supply power to the microcircuit or the portion of the microcircuit responsible for executing said predetermined operations. Instead of this, or in addition to this, said battery can be charged with solar energy by means of a photoelectric cell integrated into the electronic entity. In the current state of the art it is possible to envisage integrating into the thickness of a card at least one battery or rechargeable battery and also a photoelectric cell.

The aforementioned predetermined operations during which the microcircuit or a portion thereof is supplied with power internally and not by the server to which the electronic entity is connected (which could in fact be a device designed to break the secret codes of the card) are all exchanges of "sensitive" information, during which confidential data is exchanged. These operations are, for example, cryptographic algorithms during which keys are used or exchanged, the procedure for verifying the PIN, etc.

Alternatively, said predetermined operations can be executed by a coprocessor supplied with power by said battery while other operations are executed by a main processor supplied with power by said server. Another solution is to switch a main processor so that it is supplied with power by said battery while it is executing said predetermined "sensitive" operations, during which time periods said server supplies power to a decoy circuit, which continues to carry out operations and therefore to simulate consumption of current. However, the simulated current consumption is independent of the sensitive predetermined operations that are being executed at that time. This makes it impossible to recover sensitive data such as cryptographic keys, the PIN, etc. from a recording of the power supply current. Because the necessary current is being supplied by a battery or a rechargeable battery situated inside the electronic entity including the microcircuit, no information of interest relating to the operating status of the processor can "leak" out of the card, via the analysis of the current supplied by the server.

Even if the electronic entity is equipped with a simple non-rechargeable battery, the service life thereof is relatively long since said battery is used only to execute small program portions and not for all of the operations constituting a transaction between said electronic entity and the server. The use of a decoy or a coprocessor prevents an attacker from being able to determine the times at which the sensitive portions of the program are executed since, during those time intervals, the microcircuit continues to carry out operations, consuming current supplied by the external server.

The invention also provides an encrypted access electronic entity comprising a microcircuit and means for coupling the latter to a server itself provided with electrical power supply means for supplying power to said microcircuit via said coupling means, characterized in that it further includes an integrated energy store and selector means adapted to switch the power supply of at least a portion of said microcircuit to said energy store when predetermined operations are being executed by said at least one portion of said microcircuit.

In one embodiment, said selector means include a multiplexer or the like controlled by a processor of said microcircuit. The multiplexer has two inputs, one connected to a contact terminal for the connection to the electrical power supply means of said server and the other connected to said energy store. An output of said multiplexer is connected to an electrical power supply line of the processor. The processor commands the multiplexer to make the selection between the electrical power supply means of said server and said energy store integrated into said electronic entity.

The aforementioned contact terminal is one of the electrical contact regions that are usually found on the surface of a microcircuit card of the bank card or access control card type. However, some cards can be equipped with an antenna adapted to be coupled to an antenna situated in the server. The antenna system is used both for exchanging information and for supplying sufficient electrical energy to power the microcircuit. The invention also applies to this type of card, and in this case one of the inputs of the multiplexer is connected to a power supply circuit receiving its energy from the antenna integrated into the electronic entity (the card).

BRIEF DESCRIPTION OF THE DRAWINGS

The invention will be better understood and other advantages of the invention will become more clearly apparent in the light of the following description of embodiments of an electronic entity protected by implementing the concept explained hereinabove, which description is given by way of example only and with reference to the appended drawings, in which.

DESCRIPTION OF THE PREFERRED EMBODIMENTS

Figure 1:
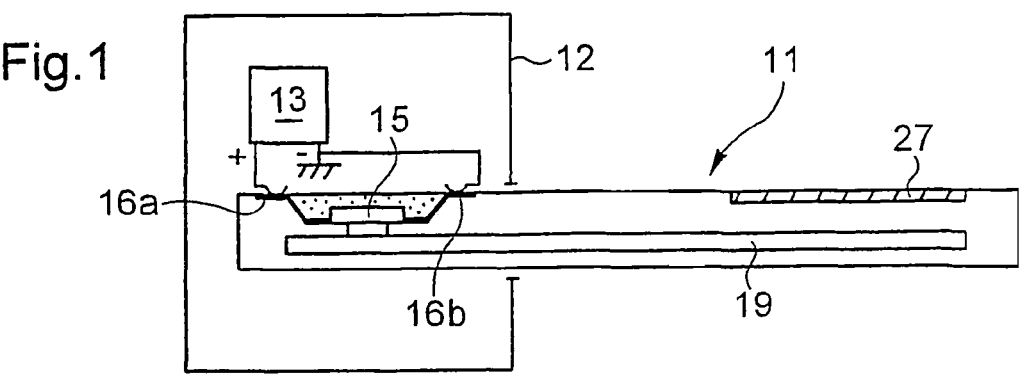
FIG. 1 is a diagrammatic view in section of a microcircuit card connected to a server and equipped with the improvement according to the invention.

Referring more particularly to FIG. 1, there is shown an electronic entity in the form of a microcircuit card 11 equipped with the improvement according to the invention and shown connected to a server 12 including an electrical power supply adapted to supply the electrical energy 13 necessary for the microcircuit housed in a cavity in the card to function. In the conventional way, the microcircuit 15 is accessible from the outside via a number of metal connection regions flush with the surface of the card. One of these regions constitutes a contact terminal 16a connected to one pole of the power supply 13 via a rubbing contact member. Another connection region constitutes a contact terminal 16b connected to the other pole of the power supply (connected to ground). The other connection regions enable exchange of information between the microcircuit and the server.

According to a noteworthy feature of the invention, a battery or a rechargeable battery 19 is accommodated within the thickness of the card. Moreover, the microcircuit includes selector means, for example essentially constituted of a multiplexer 20 or the like. The multiplexer is connected both to the contact terminal 16a intended to be connected to the electrical power supply of the server 12 and to one pole of the battery 19 housed within the thickness of the card. The other pole of the battery is connected to ground.

Figure 2:
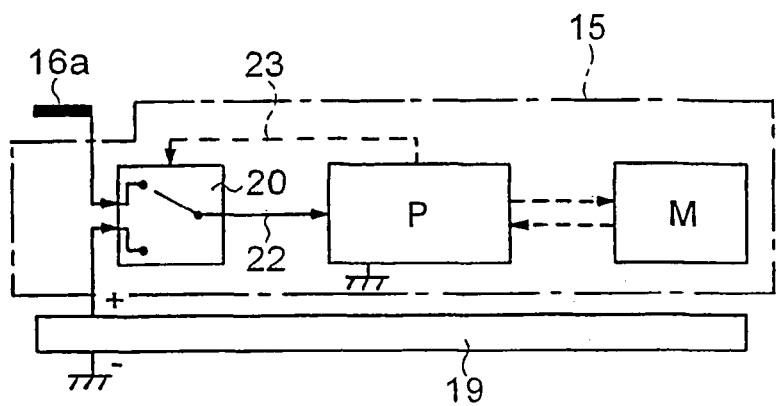
FIG. 2 is a block diagram of a first embodiment of an electronic entity according to the invention.
Figure 3:
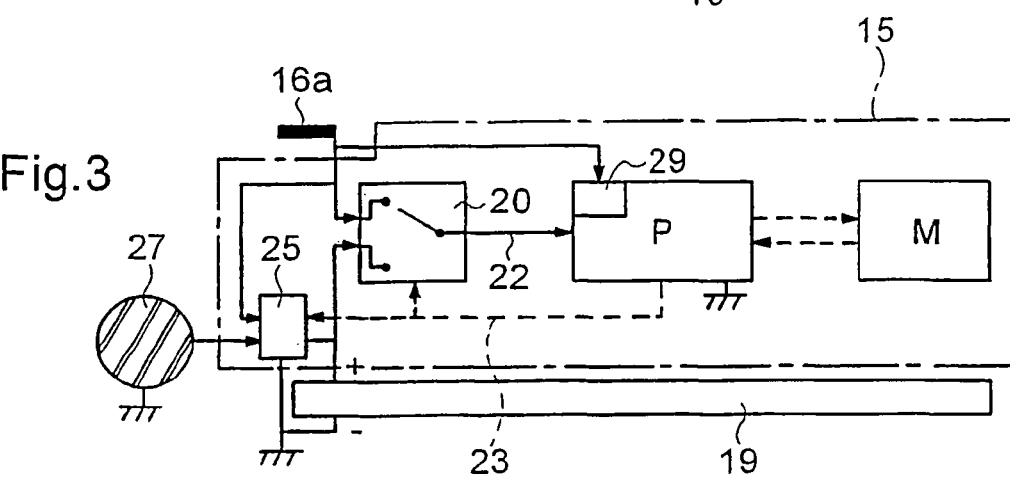
FIG. 3 is a similar block diagram, showing another embodiment.
Figure 4:
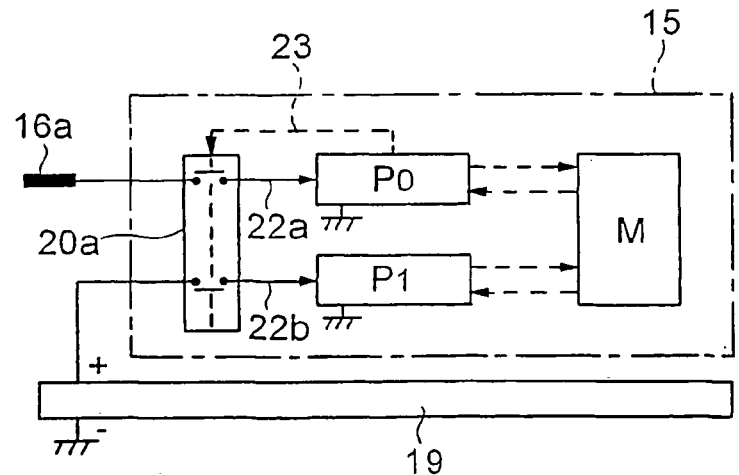
FIG. 4 is another block diagram, showing a further embodiment.

FIG. 2 shows in more detail the general arrangement of the microcircuit 15 and its connection to one pole of the battery 19. In the FIG. 2 example, the microcircuit essentially consists of a processor P, a memory unit M, and a multiplexer 20 with two inputs and one output. In FIGS. 2 to 4, power supply electrical connections are shown in continuous line and control or information exchange connections are shown in dashed line. One input of the multiplexer is connected to the contact terminal 16a and the other input is connected to one pole of the battery 19. The multiplexer constitutes selector means adapted to switch the power supply of at least one portion of the microcircuit 15, in this instance the whole of the processor P, to the integral battery 19 when predetermined operations are being executed by the processor. The predetermined operations in question are the sensitive operations defined hereinabove. The output of the multiplexer is connected to an electrical power supply line 22 of the processor. Moreover, the multiplexer (20) is controlled by the processor P (control connection 23) to select either the electrical power supply 13 of the server or the battery. In the FIG. 1 example, the battery 19 can be a simple non-rechargeable battery. The long service life of the battery is the result of the fact that it supplies power to the processor for only a small portion of the operating time of the card, i.e. when the latter is effecting sensitive operations. For all other operations, the processor is supplied with power by the power supply 13 of the server, via the contact terminal 16a and the multiplexer 20, which is set accordingly by a control signal applied via the control connection 23. In the FIG. 3 embodiment, items analogous to those of FIG. 2 are identified by the same reference numbers. In this variant, the microcircuit further includes a circuit 25 for charging the battery 19, which is rechargeable. The charging circuit 25 is connected between the contact terminal 16a and the battery 19. It is commanded by the processor P to recharge the battery when the processor is being supplied with power via the server, i.e. by the power supply 13. Advantageously, although this is not obligatory, the card also incorporates a photoelectric cell 27 connected to charge the battery 19. Here this photoelectric cell is connected to the charging circuit 25, which regulates the current, but it is not obligatory for selection of the photoelectric cell 27 to be controlled by the processor. The photoelectric cell can be connected to charge the battery at least partially when it receives sufficient illumination.

According to another advantageous feature, the microcircuit 15, and more particularly the microprocessor P, can include a decoy circuit 29 that is directly connected to the server coupling means, i.e. to the connection terminal 16a. This decoy circuit is commanded to execute operations when the remainder of the microcircuit or at least the portion thereof which executes said predetermined operations is being supplied with power by the battery 19.

In a further embodiment, shown in FIG. 4, the microcircuit 15 includes a main processor $P_0$ and a coprocessor $P_1$. The latter is dedicated to the execution of said predetermined operations. Moreover, in this example, the multiplexer 20*a* has two inputs and two outputs, forming a kind of double-pole switch, one of the switch poles being open when the other is closed, and vice-versa. The contact terminal 16*a* is connected to one of the inputs and the corresponding output is connected to the electrical power supply line 22*a* of the main processor. One of the terminals of the battery 19 is connected to the other input and the corresponding output is connected to the power supply line 22*b* of the coprocessor $P_1$. The main processor and the coprocessor are associated with a memory unit M. One of the two processors, for example the main processor, controls the selector means via a control connection 23. Thus the coprocessor is supplied with power only by the battery via the selector means.

Simplifying the FIG. 3 embodiment by connecting the power supply line 22*a* of the processor $P_0$ directly to the contact terminal 16*a* can be envisaged. The multiplexer 20*a* is then equivalent to a simple switch controlled by the processor $P_0$. In this case, it is advantageous for the processor $P_0$ to continue to execute operations (act as a decoy) when the coprocessor $P_1$ is in service.

The invention claimed is:

1. An encrypted access electronic entity comprising:
   a microcircuit for executing operations;
   a connector interface for coupling said microcircuit to a server adapted to provide power to said microcircuit via said connector interface;
   an integrated battery; and
   a selector device to connect at least one portion of said microcircuit to said battery when predetermined operations are being executed by said at least one portion of said microcircuit,
   wherein said microcircuit comprises a processor and said selector device includes a multiplexer controlled by said processor, said multiplexer having two inputs, one of which is connected to said connector interface and the other of which is connected to said battery, an output of said multiplexer being connected to an electrical power supply input of said processor, and wherein said multiplexer is commanded by said processor to selectively connect said output to one or the other of said inputs.

2. The electronic entity according to claim 1, wherein said battery is rechargeable, and further comprising a charging circuit for charging said battery, said charging circuit being connected between said connector interface and said battery and said charging circuit being commanded by said microcircuit to charge said battery when said microcircuit is coupled by said connector interface to said server.

3. The electronic entity according to claim 2, further including a photoelectric cell connected to at least partially charge said battery.

4. The electronic entity according to claim 3, wherein said photoelectric cell is connected to said charging circuit.

5. The electronic entity according to claim 1, wherein said processor includes a main processor and a coprocessor dedicated to execution of said predetermined operations, said coprocessor being supplied with power by said battery via said selector device.

6. The electronic entity according to claim 5, wherein the coprocessor is only supplied with power from said battery.

7. The electronic entity according to claim 1, wherein said microcircuit includes, in addition to said at least a portion of said microcircuit, a decoy circuit connected to said connector interface so as to be supplied with power from said server, said decoy circuit being commanded to execute operations when said at least one portion of said microcircuit is being supplied with power by said battery for execution of said predetermined operations.

8. The electronic entity according to claim 7, wherein said processor comprises said decoy circuit and a coprocessor comprising the at least a portion of said microcircuit which is powered by said battery.

9. The electronic entity according to claim 1, wherein the battery is rechargeable, and the entity includes a photoelectric cell connected to at least partially charge said battery.

10. The electronic entity according to claim 1, wherein said electronic entity is a microcircuit card.

* * * * *